United States Patent [19]

Chen

[11] Patent Number: 5,050,734
[45] Date of Patent: Sep. 24, 1991

[54] STORAGE BOX

[75] Inventor: Shun-Teng Chen, Tao Yuan Hsien, Taiwan

[73] Assignee: Shern Diau Enterprise Co., Ltd., Tao Yuan Hsien, Taiwan

[21] Appl. No.: 604,541

[22] Filed: Oct. 29, 1990

[51] Int. Cl.⁵ .............................................. A24F 15/00
[52] U.S. Cl. .................................. 206/444; 206/309; 312/12
[58] Field of Search ....................... 206/387, 444, 309; 312/10, 12

[56] References Cited

U.S. PATENT DOCUMENTS

| | | | |
|---|---|---|---|
| 4,108,511 | 8/1978 | Spragg, Jr. | 312/12 X |
| 4,330,162 | 5/1982 | Abdussouan | 206/387 X |
| 4,453,785 | 6/1984 | Smith | 312/12 X |
| 4,519,655 | 4/1985 | Kamperman | 312/12 |
| 4,647,118 | 3/1987 | Kamperman | 206/387 X |
| 4,697,704 | 10/1987 | Curry | 206/444 |
| 4,889,244 | 12/1989 | Hehn et al. | 206/387 X |

Primary Examiner—Paul T. Sewell
Assistant Examiner—BethAnne Cicconi
Attorney, Agent, or Firm—Browdy and Neimark

[57] ABSTRACT

The present disclosure provides a kind of storage box, which is suitable for compact disk collection, comprising: top wall, bottom wall, right wall, left wall, rear wall, turnable front door and plate, whereas walls are generally connected by latching means located at proper positions on the corner to form a substantial rectangular box member. In addition, said plate is guided by front door on bottom wall provided with spaced apart ribs to allow insertion of compact disk there between. The storage box so made can facilitate the transportation problem, and save space for inventory.

2 Claims, 3 Drawing Sheets

FIG. 4.
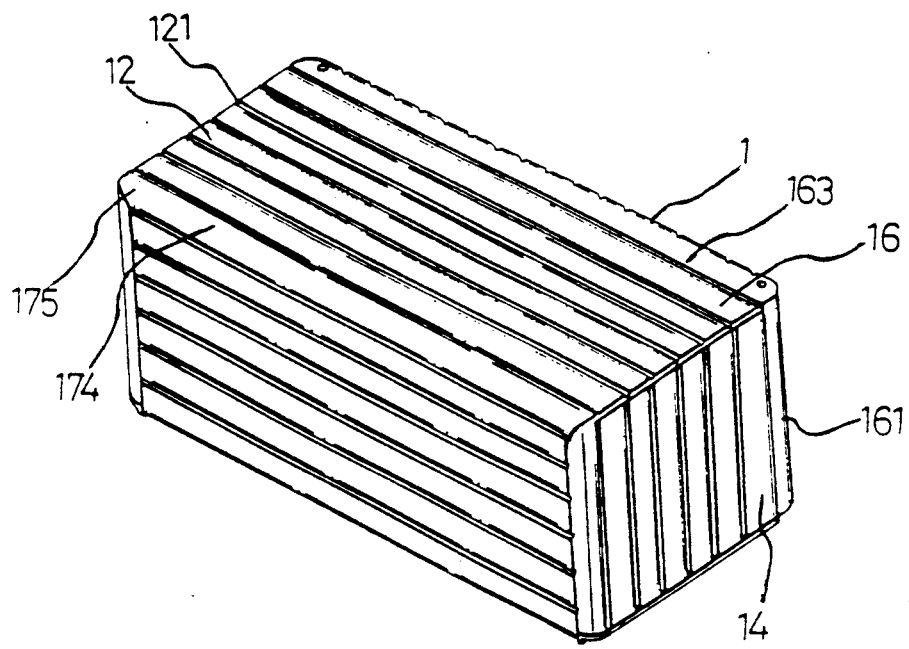
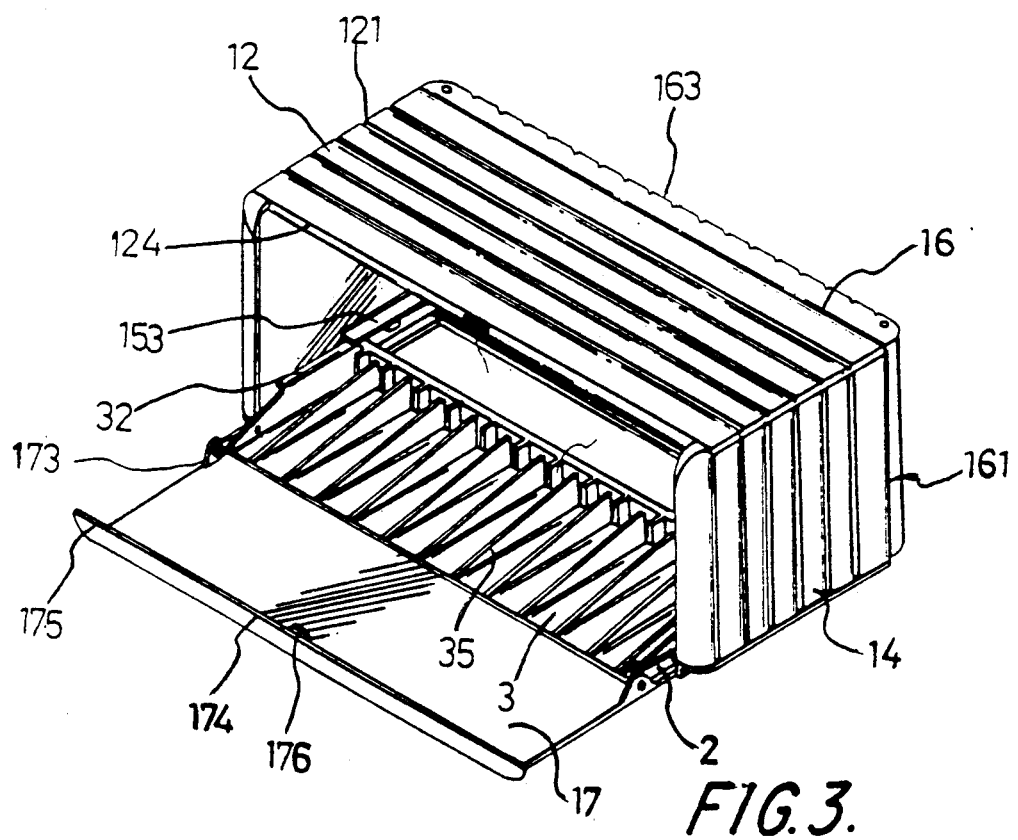
FIG. 3.

STORAGE BOX

BACKGROUND OF THE INVENTION

The present invention is related to storage box, which is suitable to collecting of compact disks A storage box is made by assembling separated pieces, where each piece is made by mold injection so that the article of manufacture can be transported very easily.

While it has been proposed similar storage box, characterizing by its inner conceived drawer(s), it is inconvenient in a way that it is difficult to locate particular compact disk and it occupies a large amount of space in transportation.

SUMMARY OF THE INVENTION

Therefore, it is an object of the present invention to overcome above mentioned disadvantages. The present invention discloses a novel storage box, which comprises top wall, bottom wall, right wall, left wall, rear wall and turnable front door provided with a plate associated with said front door via a linkage so that opening said front door will cause moving of said plate simultaneously, wherein compact disks or the like are placed on said plate.

An arrangement mentioned immediate above, therefore, is capable to resolve aforesaid problems, that is, facilitating the collection of compact disks and easing the transportation.

BRIEF DESCRIPTION OF THE DRAWINGS FIG.

1 is the perspective view of the disclosure showing assembly thereof;

FIG. 3 is the perspective view showing the front;

FIG. 4 is the perspective view showing the disclosure in rest.

DETAILED DESCRIPTION OF THE PREFERRED EMBODIMENT

Figure 1:
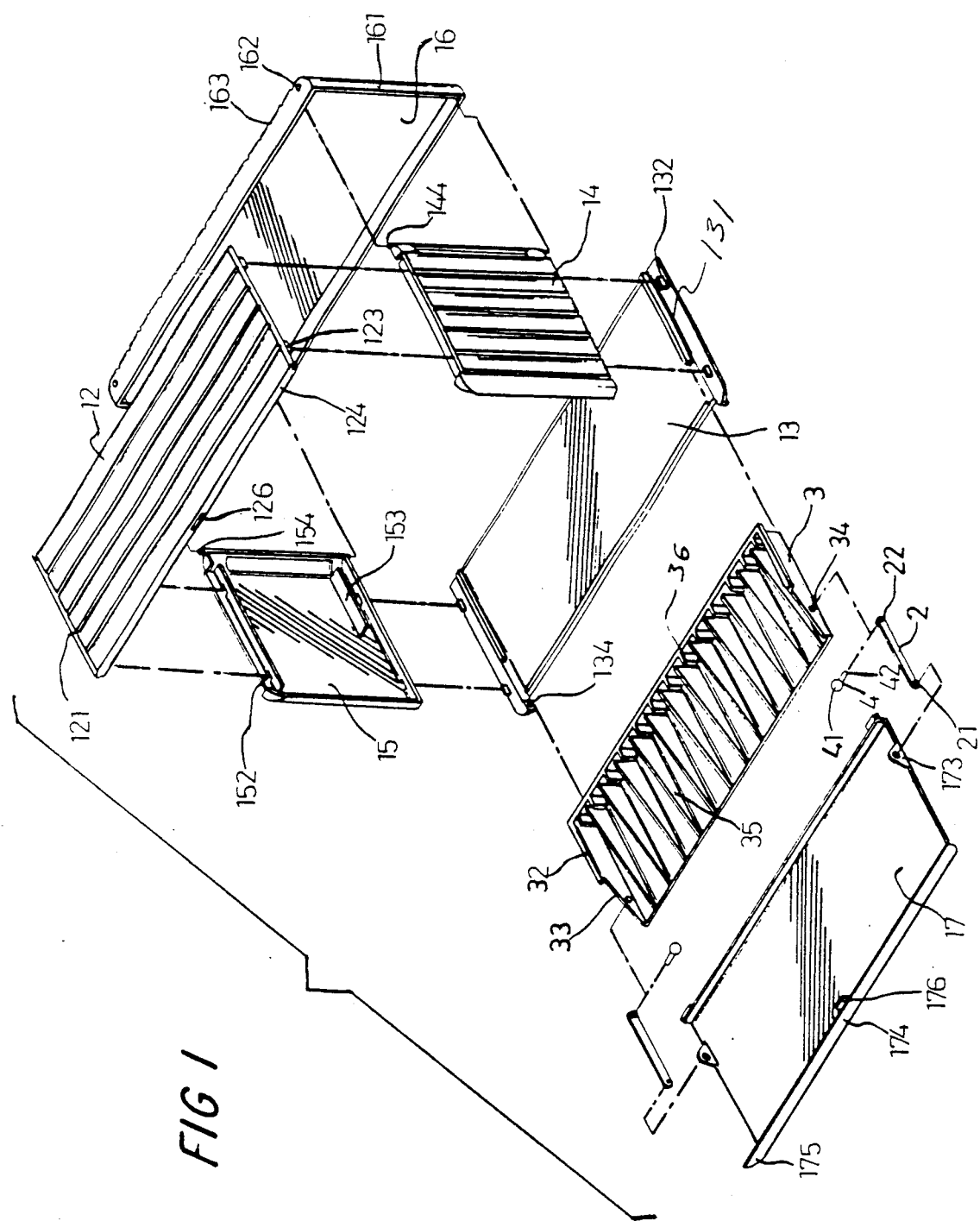
Figure 2:
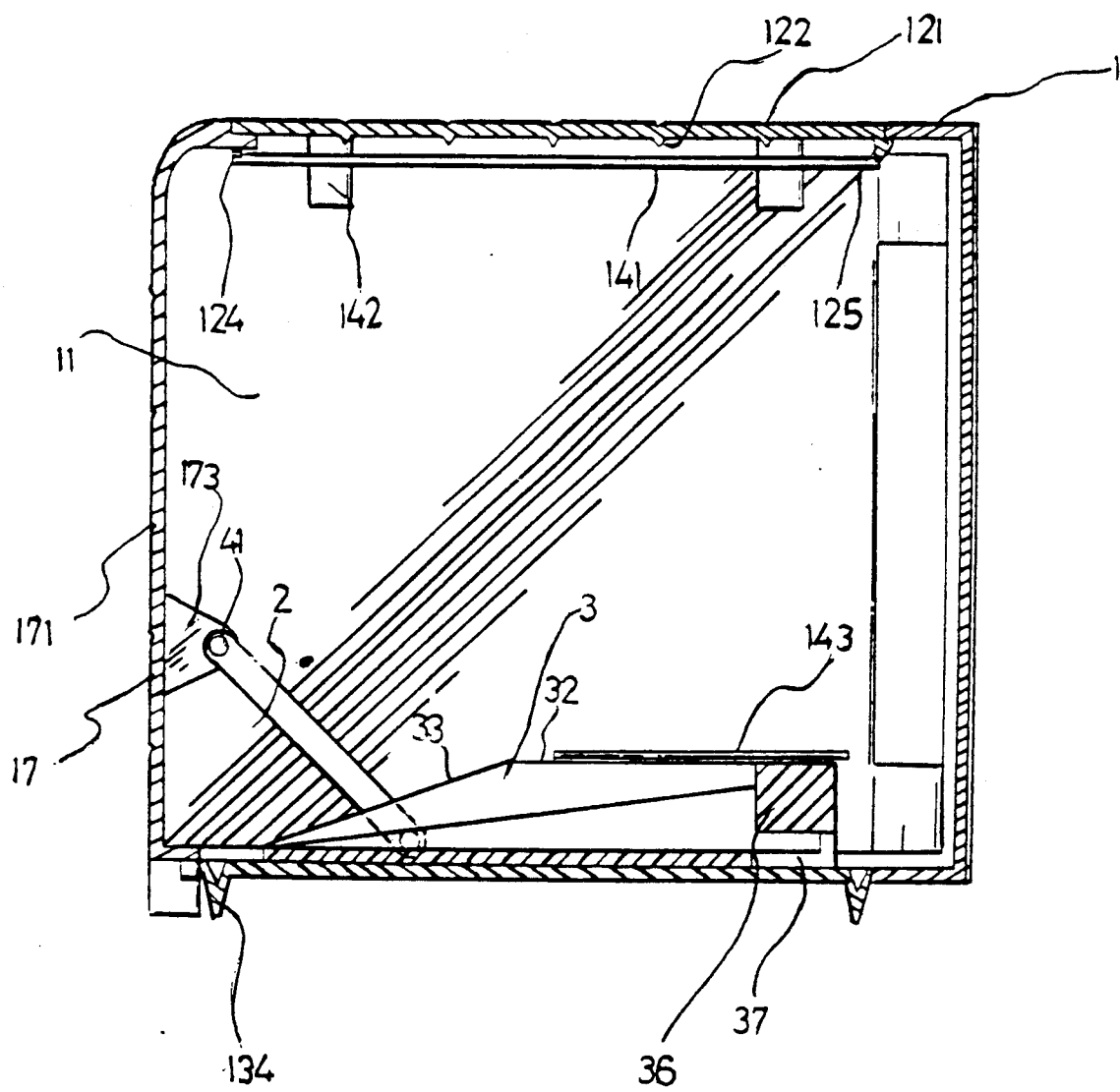
FIG. 2 is the side elevational view of the disclosure.

With referring to FIG 1, a storage box 1 is generally comprising: chamber 11 being formed of top wall 12, bottom wall 13, right wall 14, left wall 15, rear wall 16, and turnable front door 17; among which top wall 12 is having a plurality of V-shaped grooves 121 formed on upper surface thereof to receive its mirror identity V-shaped anti-slip ribs 134 formed on bottom surface of bottom wall 13, a plurality of V-shaped reinforcement 122 formed on the other surface, a plurality of resilient fingers 123 at corners to be received by corresponding recesses 152 formed on joined walls respectively for combining purpose, reinforcement 124, 125 formed on longer side of lateral rounded ends provided with a latching means 126 at substantially middle portion of reinforcement 124; bottom wall 13 is having a pair of guiding rails 131 to slidedly support plate 3, a plurality of resilient fingers 132 to be inserted into corresponding recesses 15 on left wall and recesses 14 on right wall respectively; protrusions 134 provided with pin hole formed therein functioning as a latch to incorporate with protrusions 172 formed at bottom of turnable front door 17; right wall 14 and left wall 15 are being mirror-image, having grooves 141, 151 formed in consistence with any exterior surface of said walls, recesses 142 and 152 to receive said resilient finger 123, upper rails 143, 153 to confine movement of plate 3, projection 144, 154 being an cylinder shape formed an upper and lower corners thereof to be received with through holes 162 formed on the corners of rear wall 16; rear wall 16 is having substantially curved sides 161 to over-lap corresponding side walls 14, 15 as assembling, through hole 162 to receive said projection 144, 154, a plurality of V-shaped groove purposed to reinforce the wall, being consistence to aforesaid grooves; turnable front door is having v-shaped grooves 171, protrusion 172 to incorporate with protrusion 134 functioning as latch, a pair of ears 173 formed at about ⅓ position projected to receive a linkage (described later), curved lip 174 to substantially conceive any clearance as closing, member 175 extending from curved lip 174 to facilitate opening operation, latching means 176 to incorporate with its counter part, numeral 126, by utilizing suitable gap therebetween permitting proper engagement.

Furthermore, link 2 is having through holes 21, 22 at each end to receiving pivoting means 4 having a larger head 41 and body 42 inserted into said through holes 21, 22, so that linkage is formed as shown in phantom line. Plate 3 is having rear skirt 31 to limit positioning of compact disk or the like, slide 32 extended integrally from skirt 31 to be confined by a slot formed by rails 131 of bottom wall and upper rails of left and right wall 14, 15, sides 33 further extended from said skirt and slide, being substantially declined to avoid contacting with ears 173, hole 34 to receive pivot 41, a plurality of spacers 35 declined inwardly to ease insertion of said compact disk, a plurality of rear spacers 36 formed between each spacer 35 to further limit the space therebetween for substantially inserting said compact disk.

Turning now to FIG. 3, a storage box suitable for compact disks can be summarized as follow:

First, combine rear wall 16 and side walls 14 and 15 together by jointing projection 144, 154 and holes 162; second put top wall 12 thereafter by jointing resilient fingers 123 and recesses 142, 152; third, link turnable front door 17 with bottom wall 13 via latching means 134 and 172 respectively, put plate 3 onto rail 131 and enclose bottom wall 13 toward side walls 14, 14 via resilient fingers 132 and recesses 142, 152 accordingly.

Finally, connect link 2 to ears 173 at one end on said front door 17 and hole 34 on plate 3 shown by phantom line whereas slide 32 is positioned between rails 131 and upper rail 153.

An article with this arrangement can, therefore, be open by pulling at member 175, plate to hold said compact disk can thus be pulled out via a simple linkage.

I claim:

1. A storage box comprising:
   top wall, bottom wall, left wall, right wall, rear wall, turnable front door and plate;
   wherein left wall and right wall are mirror-images, said top wall and bottom wall having resilient fingers at each corner to be received by corresponding recesses formed on left and right walls respectively;
   said left and right wall, each having a pair of protrusions each to be received by its corresponding hole formed on said rear wall;
   said bottom wall further comprising a pair of rails each formed on the left and right ends respectively, so that slides formed on ends of said plate;
   a link having a pair of through hole provided with one end pivotally mounted on plate, another end pivotedly mounted on an ear of said front turnable wall;

said plate having a plurality of rear spacers being substantially short but sufficient to hold compact disks;

said turnable front door further comprising a latching means to be received by another latching means formed on said top wall;

exterior surfaces of said walls having a plurality of V-shaped reinforcement grooves.

2. A storage box according to claim 1, wherein said plate is confined by said rails and said upper rails, and activated by said turnable front door by said link;

wherein said plate is pulled out about $\frac{1}{3}$ of the length of a compact disk with respect to said storage box.

* * * * *